March 8, 1938.  J. E. CURTIS  2,110,262
TRUCK WITH UNLOADING MEANS
Filed April 13, 1936  2 Sheets-Sheet 2

JAMES E. CURTIS
INVENTOR

PER *Albert J. Frihe*

ATTORNEY

Patented Mar. 8, 1938

2,110,262

UNITED STATES PATENT OFFICE 2,110,262

TRUCK WITH UNLOADING MEANS

James E. Curtis, Chicago, Ill., assignor to Cowham Engineering Co., Chicago, Ill., a corporation of Delaware Application April 13, 1936, Serial No. 74,143

1 Claim. (Cl. 214—83)

This invention relates to an improved truck with unloading means and has for one of its principal objects the provision of a vehicle of the class described wherein certain commodities such as cement, sand and even fine gravel or the like may be transported and unloaded without the necessity of shifting the body of the truck from the original horizontal position and also without the necessity of incorporating any movable parts such as hatches or the like into the truck body itself.

One of the principal objects of this invention is to provide a truck or similar vehicle adapted for carrying relatively heavy loads and wherein the load is distributed more equably between the front and rear wheels so as to comply with all laws regarding highway transportation.

Another important object of the invention is the provision, in a truck or trailer of the class described, of means for readily loading or filling the same with the commodity desired to be transported and means for as readily unloading the same when the vehicle has reached its destination, the unloading being accomplished in a simple, efficient and satisfactory manner.

Other and further important objects of the invention will be apparent from the disclosures in the accompanying drawings and following specification.

The invention, in a preferred form, is shown in the drawings and hereinafter more fully described.

Figure 1:
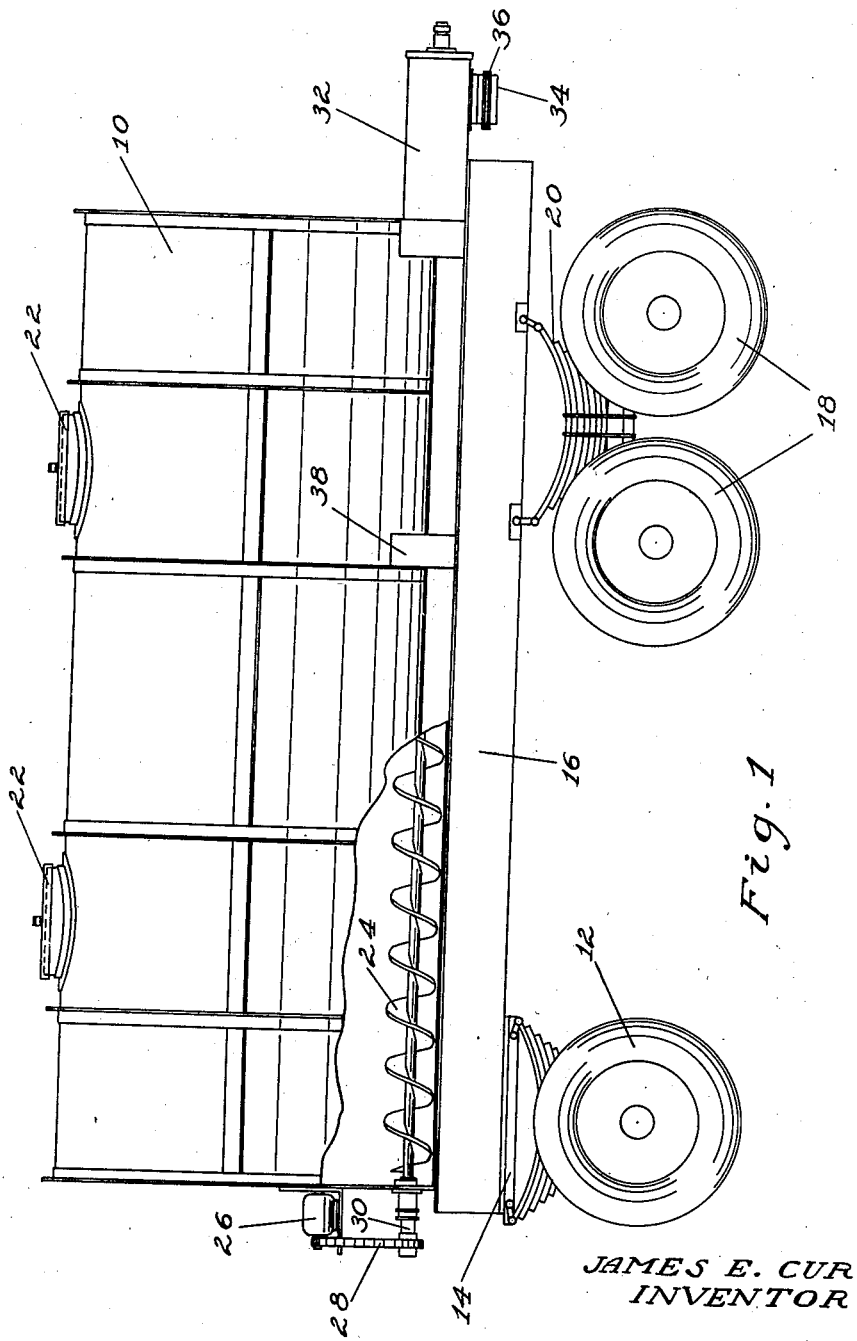
Figure 1 is a side elevation of an improved truck with unloading means constructed in accordance with the principles of this invention, parts being broken away to show the interior construction.

The reference numeral 10 indicates generally the body of the improved truck or similar vehicle of this invention, the same having front wheels 12 spring-attached to a platform 14 or the like which, in turn, is rotatably mounted on the chassis 16. A set of rear wheels 18 is provided attached by springs 20 to the rear of the chassis as shown. The device as shown is in the form of a trailer but a self-propelled vehicle may be employed, if desired.

Figure 2:
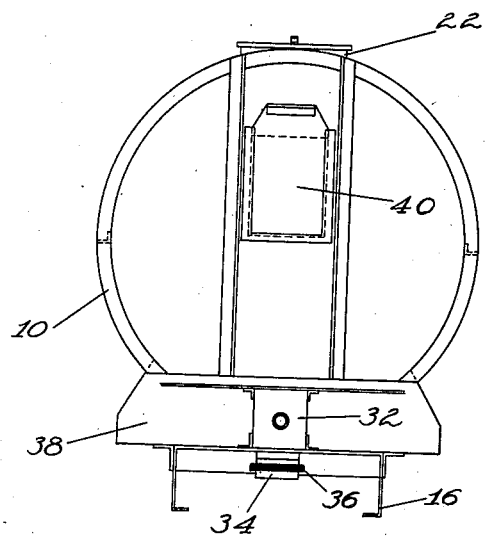
Figure 2 is a rear view of the truck body.

The body 10 is preferably cylindrical as best illustrated in Figure 2 and has manholes or loading openings 22 in the top thereof through which the material to be transported is loaded.

Heretofore, trucks or trailers of this type have been adapted for ready unloading by dumping which usually consists of raising the front end of the body by some suitable means and ejecting the load from an open gate or hatchway at the rear. However, this necessitated a springing or supporting of practically the entire load at the rear of the vehicle, which caused considerable wear and damage to roads and highways with the result that local laws were enacted prohibiting such unequal load suspensions. In the present invention, the load is more equally distributed between the front and rear wheels, and the body, instead of being designed for unloading by tilting, is provided with a screw conveyer 24 as best shown in Figure 1 which can be rotated by any suitable means such as a separate motor 26 operating through a chain 28 on a sprocket on the screw conveyer shaft 30. The screw conveyer could also be rotated by the engine of a truck or by extraneous means.

Also, as best shown in Figure 1, the screw conveyer extends throughout the body of the truck and terminates in an extension 32 which projects rearwardly of the vehicle and has at its lower face a delivery chute 34 equipped with a slidable gate or the like 36 whereby delivery of the contents may be controlled.

The tank or body 10 is supported on the chassis 16 by means of supporting blocks or saddle elements 38, and a port is provided in the rear face of the tank or truck body covered with a slidable hatch or lid 40 through which the contents may be inspected and also through which scraping implements or the like can be inserted for the purpose of aiding and accelerating the operation of the screw conveyer delivery means.

Figure 3:
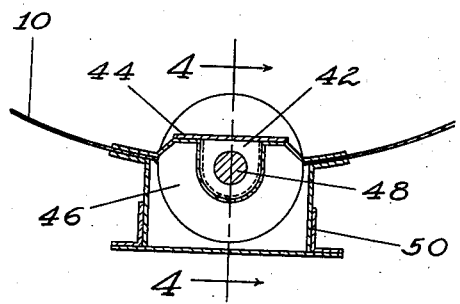
Figure 3 is an internal view, partly in section, showing the novel unloading means which comprises essentially a screw conveyer.
Figure 4:
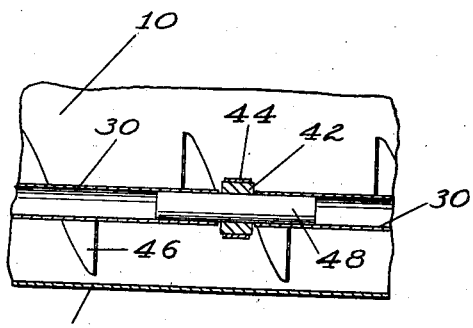
Figure 4 is a sectional view taken along the line 4—4 of Figure 3.

The shaft of the screw conveyer 30 is preferably a hollow tube or the like as shown in Figure 4, and the same is supported in suitably spaced bearing elements 42 positioned inside the truck body as best shown in Figures 3 and 4, the bearings themselves being supported by crossbraces or the like 44. At the point where the conveyer shaft 30 with its attached flights 46 are fitted into the bearings 42, a suitable connecting element in the form of a rod or shaft 48 is provided to which the conveyer shafts 30 are affixed.

Also as shown in Figure 3, the screw conveyer is partially dropped or fitted into a trough 50 which extends throughout the length of the body 10 and is somewhat below the ordinary level thereof so that the material in the truck body, which may be of any powdery or granular like consistency capable of shift or flow, will always be impelled by gravity to the lowermost portion of the body, which obviously is the trough 50, from whence it can be readily expelled or delivered by means of the operation of the screw conveyer.

Figure 5:
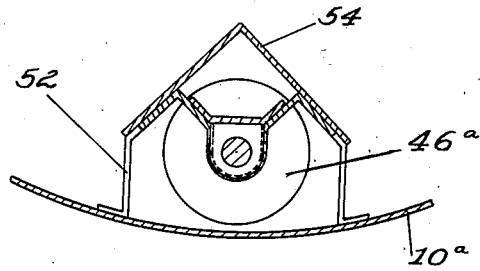
Figure 5 is a sectional view somewhat similar to Figure 3, and illustrating a modification of the invention.

It has been found that the trough 50 is not absolutely necessary. For example, as shown in Figure 5, the conveyer 46a may be mounted within the periphery of the tank body 10a by means of bearing supports and brackets 52, and in this event, it has been found advisable to partially cover the conveyer with a longitudinally extending L-shaped protecting element 54. Obviously, the supports 52 are simply spaced uprights so that the material will readily run or flow into desired contact with the conveyer flights.

It will be obvious that herein is provided a vehicle for transporting granular or powdery material which includes, as an integral part thereof, an unloading or delivery means whereby emptying of the vehicle can be readily effected while at the same time the load is more equably distributed throughout the vehicle itself with particular emphasis on lessening of the load so far as the rear wheels are concerned. Furthermore, delivery of the contents can be conveniently made into barrels, buckets, hoppers or other receptacles, and the delivery control can be more accurately gauged than would ever be possible in the case of a dump truck, while at the same time there is no waste in either the loading or unloading operations.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A vehicle for transporting and handling granular and powdery material, said vehicle including a body, and material delivery means in the body, said delivery means comprising a screw conveyer, means for supporting the conveyer in the body, said means including bearings and supporting hangers for the bearings, together with a peaked guard over the conveyer and bearings and extending the length of the conveyer, the bearings being attached to the guard, a tubular extension at the lower rear of the body, said tubular extension comprising a delivery chute and projecting rearwardly from the body, the rear end of the screw conveyer being positioned in said delivery chute, a manually controlled slide gate on the under-face of the delivery chute, and a motor for operating the conveyer, said motor positioned externally of the truck body.

JAMES E. CURTIS.